M. GOLDSTEIN.
STREET SWEEPER.
APPLICATION FILED OCT. 9, 1911.
1,047,403.
Patented Dec. 17, 1912.
2 SHEETS—SHEET 1.
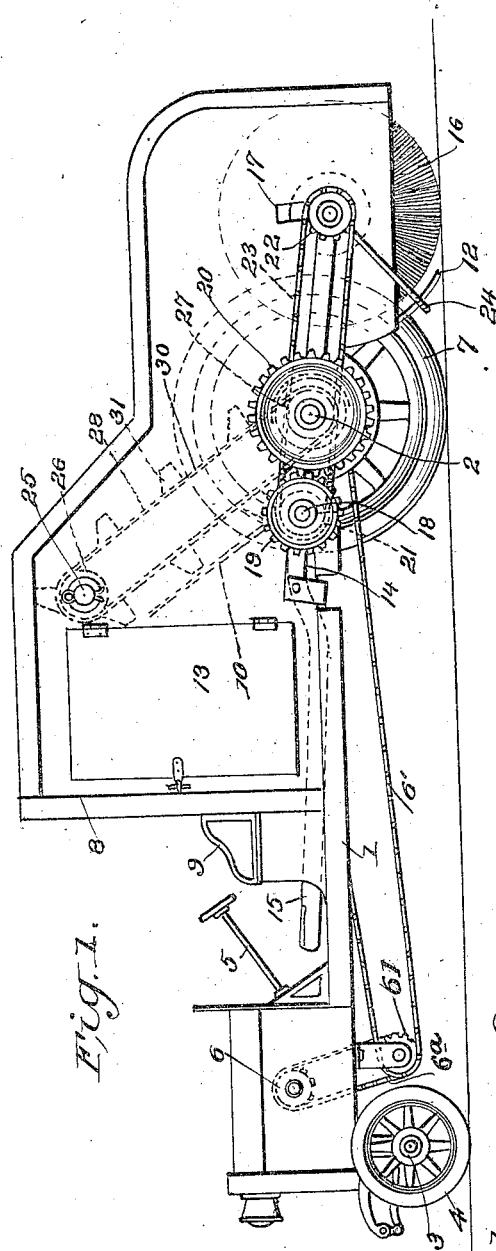
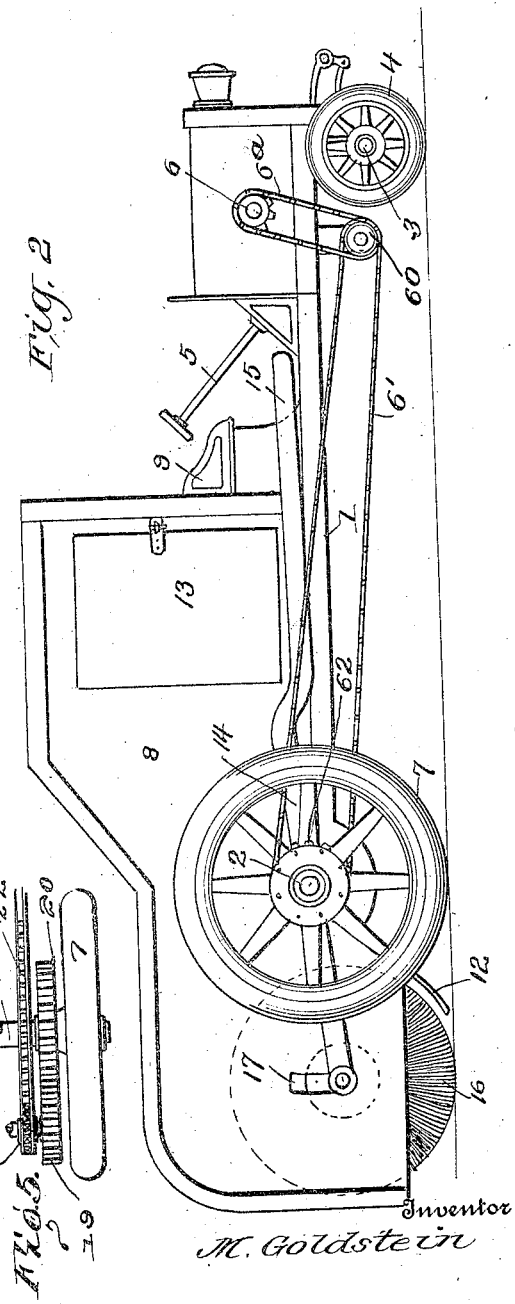
Inventor
M. Goldstein M. GOLDSTEIN
STREET SWEEPER.
APPLICATION FILED OCT. 9, 1911.
1,047,403.
Patented Dec. 17, 1912.
2 SHEETS—SHEET 2.
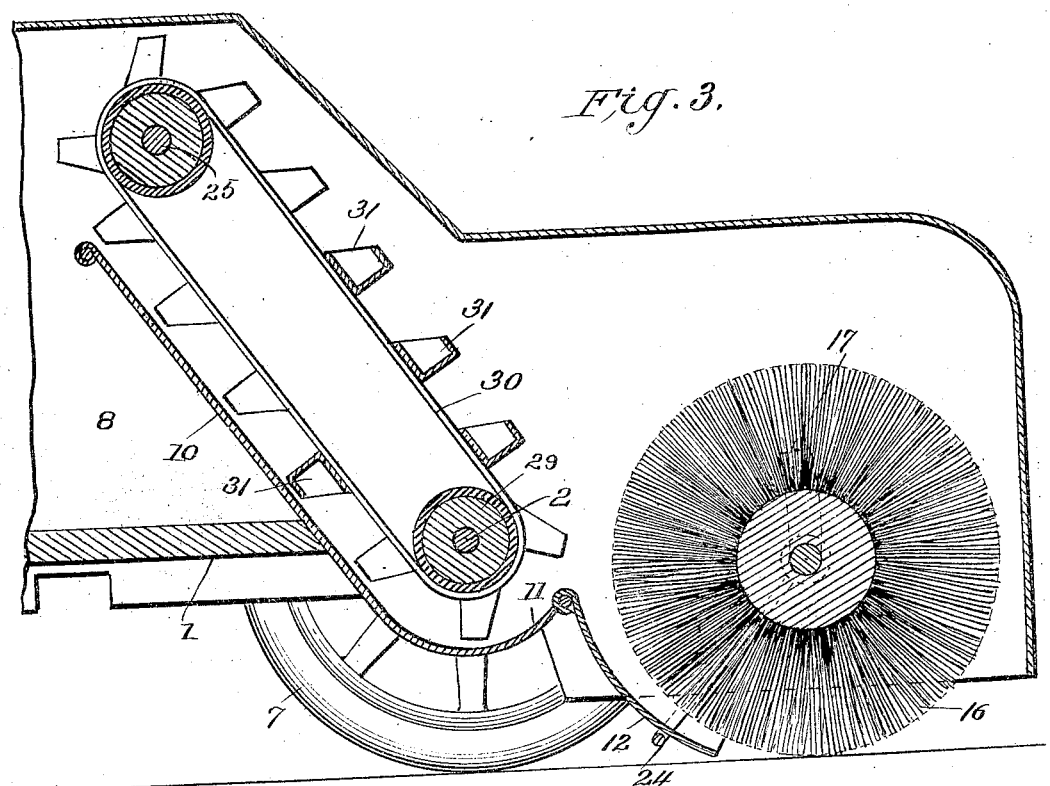
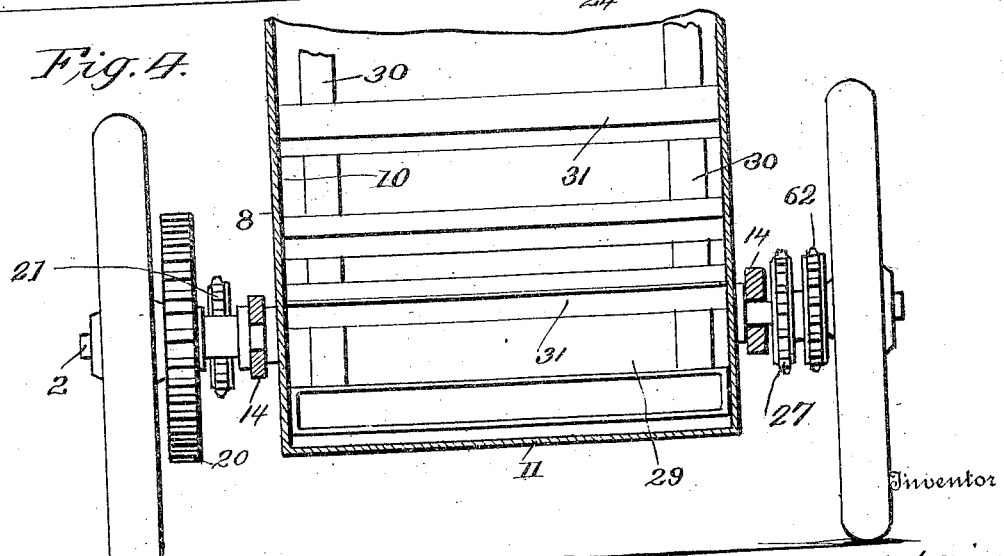

UNITED STATES PATENT OFFICE.

MARTIN GOLDSTEIN, OF KEYSTONE, WEST VIRGINIA, ASSIGNOR OF ONE-HALF TO EBENEZER H. HARPER, OF KEYSTONE, WEST VIRGINIA.

STREET-SWEEPER.

1,047,403.  Specification of Letters Patent.  Patented Dec. 17, 1912.

Application filed October 9, 1911. Serial No. 653,650.

*To all whom it may concern:*

Be it known that I, MARTIN GOLDSTEIN, citizen of the United States, residing at Keystone, in the county of McDowell and State of West Virginia, have invented certain new and useful Improvements in Street-Sweepers, of which the following is a specification.

This invention relates to street sweepers, and has for its object to provide a sweeper especially adapted to be propelled by an engine, although draft animals may be employed if desired.

The sweeper consists of a body supported in part by traction wheels and having a broom frame pivotally mounted upon the axle of the said wheels. Means is provided for swinging the frame, and a broom is journaled in the frame. An elevator is arranged within the body and is adapted to receive material from the broom, and an apron is hingedly connected upon the body and is located under the lower forward portion of the broom. A bail is connected with the frame and the apron, whereby the free end portion of the apron swings in unison with the frame of the broom. A trash receptacle is provided upon the body into which the elevator is arranged to dump.

For a full understanding of the invention reference is to be had to the following description and accompanying drawings, in which—

Figure 1 is a side elevation of the sweeper with one of the wheels removed; Fig. 2 is a side elevation, viewing the same from the opposite side to that shown in Fig. 1; Fig. 3 is a longitudinal sectional view of the rear portion of the sweeper; and Fig. 4 is a transverse sectional view of the rear portion of the sweeper. Fig. 5 is a detail plan view of a portion of the operating mechanism.

Corresponding and like parts are referred to in the following description and indicated in all the views of the accompanying drawings by the same reference characters.

As illustrated in the accompanying drawings, the sweeper includes a platform 1 which is mounted at its rear portion upon an axle 2 and at its forward portion upon a pivoted frame 3. Wheels 4 are journaled to the frame 3, and any suitable steering mechanism, indicated at 5, may be connected with the frame 3 for turning the same. An engine 6 is mounted upon the forward portion of the platform 1 and a sprocket wheel is provided upon the engine shaft externally of the frame of the machine, which sprocket wheel is connected by a sprocket chain 6ª with a similar sprocket wheel 60 on a shaft which is mounted in a suitable bearing on the underside of the machine. A sprocket chain 6' is trained around the sprocket wheel 61 on the same shaft with the sprocket wheel 60, and a sprocket wheel 62, fixed upon the rear axle, so that the motion of the engine shaft will be transmitted to said axle and the traction wheels 7 which are fixed upon the ends of the axle. A body 8 is mounted upon the platform 1 and also an operator's seat 9. An upwardly and forwardly inclined partition 10 is arranged in the body 8 and a trough 11 is provided at the lower rear end of the said partition. An apron 12 is hinged at the rear edge of the trough 11 and has its free edge portion rearwardly disposed. The forward portion of the body 8 constitutes a trash receptacle and is provided at its opposite sides with doors 13 through which the trash may be removed from the said body.

A frame 14 is pivotally mounted upon the axle 2 and is provided at one side with an elongated bar 15 which extends toward the forward portion of the platform 1 and is within reach of one occupying the seat 9, whereby the frame 14 may be swung upon the axle 2 by an operator upon the seat. A broom 16 is journaled for rotation at the rear portion of the frame 14 and its shaft passes through arcuate slots 17 provided in the sides of the body 8. A stub shaft 18 is carried at the forward portion of one side of the frame 14 and a gear wheel 19 is journaled upon the said stub shaft. The gear wheel 19 meshes with a gear wheel 20 fixed to the axle 2 at the end opposite the end carrying the sprocket wheel 62. A sprocket wheel 21 is fixed to the side of the gear wheel 19 and a sprocket wheel 22 is fixed to one end portion of the shaft of the broom 16 in the same longitudinal plane as the sprocket wheel 21. A sprocket chain 23 passes around the sprocket wheels 21 and 22 and its runs are at the opposite sides of the axle 2. It will thus be seen that the rotation of the axle derived through the sprocket wheel 62 and the parts actuating the same is transmitted through the gear wheels 20 and 19 to the shaft 18, so that the said shaft will rotate in a direction opposite to the direction of rotation of the axle. The rotation of said shaft 18 is transmitted through the sprocket wheel 21, chain 23, and sprocket wheel 22 to the brush, as will be readily understood. A bail 24 is connected with the end portions of the shaft of the broom 16 and its intermediate portion extends down under the free edge portion of the apron 12. Therefore it will be seen that when the frame 14 is swung the broom 16 is raised or lowered within the body 8 and the free edge portion of the apron 12 is swung by the bail 24 in unison with the broom.

A shaft 25 is journaled in the sides of the body 8 beyond the upper end of the partition 10 and a sprocket wheel 26 is fixed to one end of the said shaft 25. A sprocket wheel 27 is fixed to one end portion of the axle 2 and a sprocket chain 28 is trained around the sprocket wheels 26 and 27 and is adapted to transmit rotary movement from the axle 2 to the shaft 25. A sleeve 29 is mounted upon the axle 2 between the sides of the body 8 and is located approximately concentrically with relation to the trough 11. Endless belts 30 are trained around the sleeve 29 and the shaft 25 and carry a series of buckets 31.

The operation of the sweeper is as follows: As it is moved over the surface of a street, and the rear portion of the frame 14 is in its lower position, the broom 16 engages the surface of the street and at the same time is rotating in a direction opposite to that of the traction wheels. Consequently the trash upon the surface of the street is engaged by the broom and moved up along the apron 12 and deposited in the trough 11. At the same time the buckets 31 move in an orbit about the shaft 25 and the sleeve 29 and the upper run of the conveyer moves upward. Consequently the buckets scoop up the material from the trough 11 and carry the same upward, and as the buckets turn over the shaft 25 the material is dumped into the forward portion of the body 8. If at any time it is desired that the broom 16 should cease its sweeping operation, the forward end of the bar 15 is depressed, whereby the frame 14 is swung upon the axle 2 and the lower portion of the broom 16 is raised above the surface of the street. As the forward portion of the frame 14 descends, the gear wheel 19 will follow around the forward portion of the gear wheel 20, but the teeth of the said gear wheels will remain in mesh.

Having thus described the invention, what is claimed as new is:

A sweeper comprising a body, an axle supporting the same, ground wheels supporting the axle, a broom frame pivoted upon the axle, a broom carried by the broom frame and located in the body, means for rotating the axle, means operatively connecting the axle with the broom, a partition located in the body and having its lower portion continued into a trough which is located below the axle, a conveyer mounted for movement along the partition, means for operating the conveyer from the axle, and an apron extending from said trough beneath said brush.

In testimony whereof I affix my signature in presence of two witnesses.

MARTIN GOLDSTEIN. [L. S.]

Witnesses:
 CHARLES BUDWICK,
 PHILIP WOLFE.